United States Patent [19]
Pauli

[11] Patent Number: 5,448,546
[45] Date of Patent: * Sep. 5, 1995

[54] OPTICAL STORAGE MEDIA LIGHT BEAM POSITIONING SYSTEM

[75] Inventor: Giles A. Pauli, Austin, Tex.

[73] Assignee: Texas Instruments Incorporated, Dallas, Tex.

[ * ] Notice: The portion of the term of this patent subsequent to Mar. 1, 2011 has been disclaimed.

[21] Appl. No.: 106,027

[22] Filed: Aug. 13, 1993

Related U.S. Application Data

[63] Continuation of Ser. No. 534,103, Jun. 6, 1990, Pat. No. 5,291,473.

[51] Int. Cl.⁶ ............................... G11B 7/00
[52] U.S. Cl. ............................ 369/112; 369/124
[58] Field of Search ............ 369/112, 120, 117, 121, 369/94, 95, 44.15, 44.23; 359/198, 199, 214, 221, 224, 855

[56] References Cited

U.S. PATENT DOCUMENTS

| | | | |
|---|---|---|---|
| 4,011,003 | 3/1977 | Dragt | 369/44.17 |
| 4,550,249 | 10/1985 | Damen et al. | 369/44.42 |
| 4,596,992 | 6/1986 | Hornbeck | |
| 4,662,746 | 5/1987 | Hornbeck | |
| 4,728,185 | 3/1988 | Thomas | |
| 4,771,415 | 9/1988 | Taki | 369/112 |

FOREIGN PATENT DOCUMENTS

| | | | |
|---|---|---|---|
| 0332953 | 9/1989 | European Pat. Off. | |
| 2296297 | 7/1976 | France | |
| 61-282817 | 12/1986 | Japan | 369/44.14 |
| 61-284169 | 12/1986 | Japan | 369/44.14 |
| 63-197034 | 8/1988 | Japan | 369/121 |
| 01070935 | 3/1989 | Japan | 369/121 |
| 63-083924 | 4/1989 | Japan | 369/44.14 |
| 01158626 | 6/1989 | Japan | 369/112 |
| 01258231 | 10/1989 | Japan | 369/121 |
| 2123247 | 1/1984 | United Kingdom | |
| 2175705 | 12/1986 | United Kingdom | |
| 8503376 | 9/1985 | WIPO | |

OTHER PUBLICATIONS

Collins et al. "Optical Neurocomputers Implementation Using Deformable Mirror Arrays", IEEE First International Conf. on Neural Networks.

Nelson and Hornbeck, Texas Instruments, Inc., Dallas, Tex., "Micromechanical Light Modulators for Electrophotographic Printers".

Gregory et al., "Optical Characteristics of a Deformable-Mirror Spatial Light Modulator", 13 Optics Letters 10, Jan., 1988.

Hornbeck, "128×128 Deformable Mirror Device", 30 IEEE Transactions on Electron Devices 539, May 1983.

Fujitanj, "Optical Disk Technology", Electronic Engineering, Nov. 1983, at 53.

Ohr, "Magneto-Optic Combines Erasability and High Density Storage", Electronic Design, Jul. 11, 1985 at 93.

Laub. Zenith Radio Corporation, Chicago, Ill., "Optics of Reflective Video Disk Players".

Bell, "Optical Data Storage Technology, Status and Prospects", Computer Design, Jan. 1983, at 133.

*Primary Examiner*—Georgia Y. Epps
*Assistant Examiner*—P. W. Huber
*Attorney, Agent, or Firm*—Charles A. Brill; James C. Kesterson; Richard L. Donaldson

[57] ABSTRACT

An optical tracking system 10 is provided which comprises a beam source 12 which generates a light beam. The light beam travels through a splitter/filter 14 and proximate a DMD array 16. The DMD array 16 is controlled by a DMD array control system 18 which causes a single element within the DMD array to deflect the light beam towards a selected track on an optical storage medium 22. The optical storage medium 22 reflects the beam dependent upon the data stored on the selected track. The reflected beam is deflected by the DMD array 16 back to the splitter/filter 14 which separates the reflected beam from the impinging beam and directs the reflected beam to a detector 24 which discerns the information stored in the storage medium 22 responsive to the receipt of the reflected beam.

10 Claims, 1 Drawing Sheet

OPTICAL STORAGE MEDIA LIGHT BEAM POSITIONING SYSTEM

This is a continuation of U.S. application Ser. No. 07/534,103, filed Jun. 6, 1990, now U.S. Pat. No. 5,291,473.

TECHNICAL FIELD OF THE INVENTION

This invention relates in general to the field of electronic systems and more particularly, the present invention relates to a method and apparatus for positioning a beam of light on a surface of an optical storage medium.

BACKGROUND OF THE INVENTION

The ability to efficiently store and retrieve data is an essential component of any integrated electronic system. In recent years, the development of optical storage systems has allowed greater storage densities than previously known. An important concern of any storage media, including optical storage media, is the time required to access the storage system to either store or retrieve data.

Optical storage media are currently used in a variety of forms. Optical disks, rectangular optical media, and optical tape are some of these forms. In each of these forms of optical storage media, a laser is used to write and read from the optical storage media. In general, the beam of light is directed from laser to the surface of the optical storage media where it is reflected. The reflected beam of light is routed to a detector which can read the data stored on the optical storage media responsive to the receipt of the reflected beam.

The methods and apparatus used to direct the beam of light to the appropriate section of the optical storage media are by far the slowest portion of the data storage and recovery system. For example, the typical optical storage disk drive available currently have on the order of 35 to 100 millisecond access times and additionally a rotational latency of approximately 16 milliseconds. In comparison, the controllers associated with these systems are working with an overhead of approximately one milli-second. Accordingly, there is approximately a two order of magnitude difference between the mechanical access time of the optical storage drives and the remaining circuitry necessary to access data from the storage media. The primary reason for the slow nature of, for example, an optical storage disk drive, is the time required to mechanically position the optics which are used to direct the beam of light to and from the appropriate positions on the surface of the optical storage media. An additional factor increasing the access times of optical storage disk drives is the rotational latency of the disk as it turns to bring the desired portion of the disk proximate the reading optics. Most current systems use a carriage assembly which holds various mirrors and optics and which is mechanically positioned over a section of the optical storage disk, for example. Data accessing must then wait for the optical disk to mechanically rotate to the desired section. The positioning of these carriage assemblies accounts for the first order term of the delay in accessing the optical storage media. The rotational latency accounts for the second order delay term.

Accordingly, a need has arisen for an optical tracking system which eliminates the need for the mechanical positioning of a carriage assembly and/or eliminating rotational latency and therefore reduces the time required to access the data stored in an optical storage media.

SUMMARY OF THE INVENTION

In accordance with the present invention, an optical tracking system is provided which substantially eliminates or reduces disadvantages and problems associated with prior optical storage accessing systems. According to one embodiment of the present invention, an optical tracking system is provided which comprises a deformable mirror device array also known as digital micromirror devices (DMD). A beam of light is generated and directed proximate the surface of the DMDs array. A particular DMDs within the array may be deflected into the path of the light beam while non-deflected elements within the army will allow the beam to pass over them. The deflected element within the DMDs array will deflect the light beam to a selected track within an optical storage medium, conventional beam splitters, optical filters and detectors are used to read the data from the reflected beam. An array control system is provided to select the particular DMDs.

According to another embodiment of the present invention, a light beam source generates a light beam which is widened such that it illuminates the entire DMDs. A single DMDs within the array can be deflected to select a particular track on the optical storage medium associated with that DMDs. The selected DMDs directs a portion of the widened beam to the selected track on the optical storage medium which reflects the beam according to the data stored in that track of the optical storage medium. Control systems and detection systems are provided as described previously.

An important technical advantage of the present invention inheres in the fact that the DMDs army systems provide extremely fast access to particular tracks within an optical storage medium without requiring the cumbersome movement of mechanical carriage assemblies, common in prior optical tracking systems. A further important technical advantage of the present invention inheres in the fact that the DMDs arrays can be manufactured using semiconductor processes to provide for an extremely efficient, reliable and inexpensive high quality reflective surface which is selectable using conventional semiconductor addressing techniques and circuits.

BRIEF DESCRIPTION OF THE DRAWINGS

A more complete understanding of the present invention may be acquired by referring to the detailed description and claims when considered in connection with the accompanying drawings in which like reference numbers indicate like features, and wherein:

DETAILED DESCRIPTION OF THE INVENTION

Figure 1:
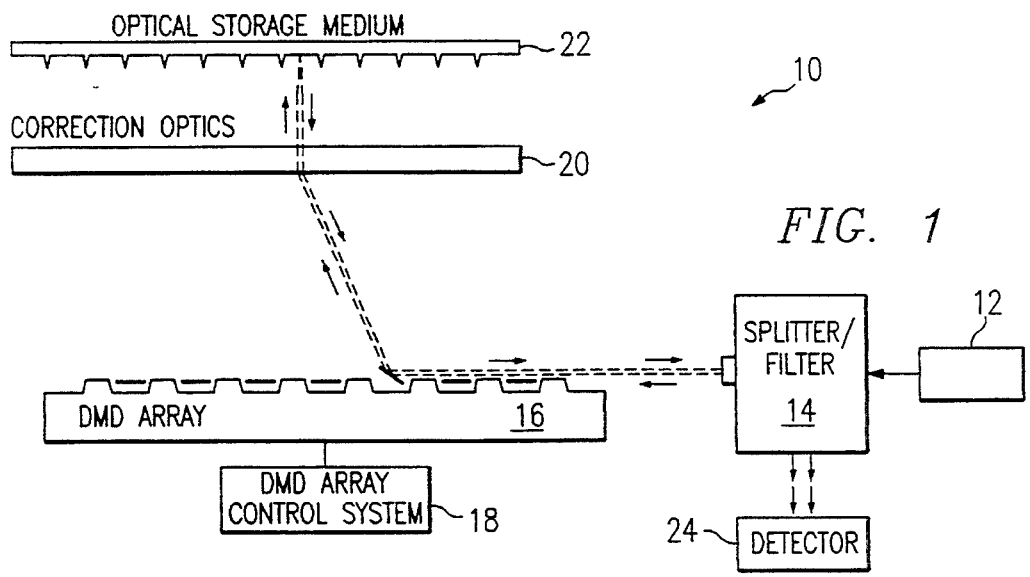
FIG. 1 is a schematic diagram of one embodiment of the optical tracking system of the present invention.

Referring to FIG. 1, an optical tracking system constructed according to the teachings of the present invention is indicated generally at 10. System 10 comprises a light beam source 12 which is operable to generate a light beam and transmit the light beam through a splitter/filter 14. The light beam issues from splitter/filter 14 and travels proximate the surface of a deformable mirror device, also known as digital micromirror device [DMD] array 16. DMD array 16 may comprise, for example, a linear array of deformable mirror devices which are capable of angular deflection on the order of plus or minus 9 degrees when an individual element is selected through an addressing system integral with the DMD array 16. The selection and addressing of the particular elements within the DMD array 16 is controlled by a DMD array control system 18.

DMD arrays, such as DMD array 16, are known in the art and have been applied in such applications as printers. A complete description of a suitable DMD array may be found in U.S. Pat. No. 4,596,992 issued to Hornbeck entitled, "Linear Spatial Light Modulator and Printer". A possible embodiment of the elements of DMD array 16 will be described more fully with reference to FIG. 3 herein. It should be understood that the description of the present invention using an array of DMD's is solely for the purpose of teaching important technical advantages of the present invention and should not be construed to limit the present invention to this or any embodiment. For example, the system of the present invention could use other methods of controlling a light beam such as an array of conventional mirrors or a fiber optic array controlled with EMI fields. These and other embodiments are intended to be included within the scope of the present invention.

In operation, DMD array 16 functions to selectively deflect the beam of light through a system of correction optics 20 and on to a selected track within an optical stored medium 22. Optical storage medium 22 may comprise, for example, an optical storage disk which rotates at a suitable rate to allow for the efficient access of information storage positions on the surface of the medium 22. The optical storage medium 22 reflects the beam of light according to the data stored on its surface and the beam of light returns through correction optics 20 and is deflected back to splitter/filter 14 by the particular element selected within DMD array 16. The splitter/filter 14 separates out the reflected beam from the impinging beam using known methods and directs the reflected beam to a detector 24 which is operable to discern the information stored in the selected track of optical storage medium 22 responsive to the receipt of the reflected beam from splitter/filter 14.

It should be understood that while the DMD array 16 is shown having only a small number of individual elements, in actual practice DMD array 16 could have an extremely large number of individual elements corresponding to a one-for-one relationship between the number of DMD elements within the array 16 and the number of tracks desired to be accessed on optical storage medium 22 at any one time. According to one embodiment, DMD array 16 could have as many individual elements as the total number of tracks in optical storage medium 22. According to this embodiment, the DMD array 16 could provide almost instantaneous access to any track in optical storage medium 22 without having to reposition DMD array 16 relative to optical storage medium 22.

If a one-for-one relationship between the number of elements in DMD array 16 and the number of tracks desired to be accessed on optical storage medium was not practical because of the particular physical constraints of a particular application, DMD array 16 could have a smaller number of elements than the total number of tracks on optical storage medium 22. The DMD array 16 would then have to be repositioned whenever a track was desired to be read from optical storage medium 22 that did not fall within the current accessing capability of the current position of the DMD array 16. While this configuration would still require a mechanical movement of a carriage assembly comprising DMD array 16, it would still be an improvement over current systems in that a plurality of tracks could be accessed from any one mechanical positioning of the DMD array 16. Accordingly, the number of mechanical positionings would be greatly decreased and a corresponding decrease in the average access time would result. The repositioning of DMD array 16 necessary for this embodiment could be accomplished using conventional carriage assemblies known in the art.

DMD array 16 is shown with its individual elements in a linear relationship to one another. It should be understood that the density of the tracks on any particular optical storage medium 22 may require staggering of the elements within the DMD array 16 into two or possibly even more rows of individual elements. Conventional optical techniques can be used to provide a beam of light passing over each element within DMD array 16 regardless of the actual number of rows used within DMD array 16.

Further, while the schematic illustration of system 10 in FIG. 1 indicates that the particular elements within DMD array 16 would all have constant deflection, it should be understood that the particular elements within DMD array 16 may have variable deflections within the array 16. For example, the maximum deflection of an element at one end of the array 16 might be much larger than the maximum deflection of an element at the opposite end of array 16 depending upon the required spacing and positioning of the physical elements within the optical tracking system 10.

Figure 2:
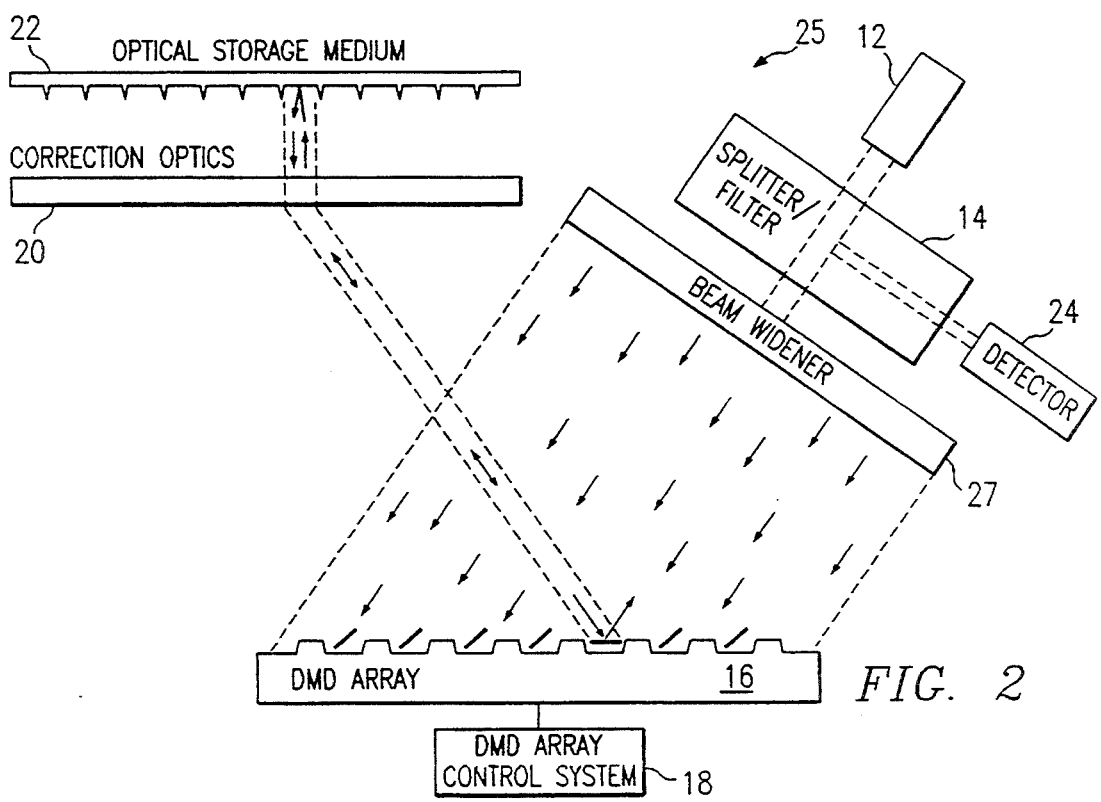
FIG. 2 is a schematic diagram of a second embodiment of the optical tracking system of the present invention.

Referring to FIG. 2, a second possible embodiment of the optical tracking system of the present invention is indicated generally at 25. System 25 is similar to system 10 illustrated in FIG. 1 and comprises a beam source 12, a splitter/filter 14, a DMD array 16, a DMD control system 18 and correction optics 20. System 25 similarly reads data storage positions on an optical storage medium 22 through the use of a detector 24. System 25 differs from system 10 in that it also comprises a beam widener 27. Additionally, the orientation of the impinging beam on DMD array 16 is different than that in system 10. According to the operation of system 25, a beam is received from splitter/filter 14 by beam widener 27 which functions to illuminate the entire surface of DMD array 16. A single element within DMD array 16 may be deflected in such a manner that only a single track on optical storage medium 22 is contacted by the reflected beam. The remaining elements within DMD array 16 deflect the light received from beam widener 27 away from the correction optics 20 and the optical storage medium 22. In this manner, a single track of optical storage medium 22 may be selected by the deflection of a single element within DMD array 16.

The reading of data by detector 24 is accomplished in a similar manner as discussed previously with respect to system 10 of FIG. 1. DMD array 16 is shown in FIG. 2 to have the non-selected elements within the array in a deflected orientation while the selected element is substantially parallel to the surface of array 16. It should be understood that this method of operation is merely one possible embodiment of the present invention and depending upon the orientation of beam source 12, array 16 and optical storage medium 22, various orientations and deflections could be used for the non-selected elements and the selected elements. These other orientations are intended to be included within the scope of the present invention and the selection of the orientation shown in system 25 is merely for the purpose of teaching the present invention. It should also be understood that the comments made within respect to system 10 of FIG. 1 having to do with the staggering of the elements within DMD array 16 as well as the variable deflection possibilities within DMD array 16 are equally applicable to system 25. In addition, DMD array 16 may or may not contain a number of elements equal to the total number of tracks within optical storage medium 22. As discussed previously, DMD array 16 could be used to define and provide almost instantaneous access to a predetermined number of tracks within optical storage medium 22 and still greatly improve on the access times currently known.

Figure 3:
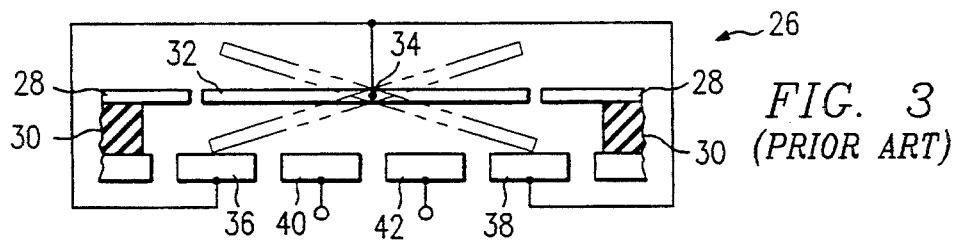
FIG. 3 is a cross-sectional schematic diagram of a single deformable mirror device which may be used in conjunction with the optical tracking system of the present invention.

FIG. 3 is a cross-sectional schematic diagram of a deformable mirror device which could be used for the DMD elements within DMD array 16 in the present invention. FIG. 3 illustrates a deformable mirror device indicated generally at 26. The deformable mirror device 26 may be fabricated using known methods over a semiconductor substrate which itself can incorporate an integrated CMOS address structure. As shown in FIG. 3, deformable mirror device 26 comprises an outer aluminum ahoy layer 28 separated from the underlying CMOS address layers by a sacrificial spacer layer 30. During the manufacture of DMD 26, a portion of the outer aluminum alloy layer 28 is removed by a metal etch step to define a torsion beam 32. A torsion rod 34 is formed passing through torsion beam 32 and connecting it to the remainder of the outer layer 28. The cross section shown in FIG. 3 is perpendicular to the long axis of torsion rod 34. After the torsion beam 32 has been defined by the metal etch step, the spacing material in layer 30 is removed beneath the torsion beam 32 using an isotropic plasma etching step to form an air gap capacitor between the torsion beam 32 and the underlying address structure. The underlying address structure comprises a first landing electrode 36, a second landing electrode 38 and first and second address electrodes 40 and 42 as shown in FIG. 3.

In operation, signals may be placed on first and second address electrodes 40 or 42 to rotate the torsion beam 32 about the torsion rod 34. By placing appropriate signals on address electrodes 40 and 42, the torsion beam 32 can be made to rotate in either direction until the ends of the torsion beam 32 nearly contact the landing electrodes 36 and 38. For example, a voltage can be placed on address electrode 42 tending to attract torsion beam 32 causing torsion beam 32 to rotate in a clockwise direction. A second voltage may simultaneously be placed on address electrode 40 to repel torsion beam 32 to initiate the clockwise rotation. Similar signals may be used to achieve a counter-clockwise rotation of torsion beam 32. Conventional signal processing techniques can be used to generate the required voltages and timing of the signals to be placed on address electrodes 40 and 42.

Using known methods, a deformable mirror device such as deformable mirror device 26 can be constructed to have a maximum deflection of the torsion beam 32 of plus or minus 9 degrees from horizontal. As discussed previously, other angles of deflection may be useful at various points in the array 16. These other angles can be accomplished by altering the spacing between the landing electrodes 36 and 38 and torsion beam 32. The individual elements within DMD array 16 can also be controlled linearly using analog control signals to provide for various angles of deflection.

The torsion beam can respond to voltages placed on address electrodes 40 or 42 in approximately 12 microseconds. This obviously represents a substantial improvement over the 35 to 100 millisecond response times common in the present tracking systems available. The aluminum ahoy used to manufacture torsion beam 32 provides a superior mirror surface to prevent any distortion of the beam received from splitter/filter 14 and generated by beam source 12. Further, the small area occupied by and mass of the torsion beam 32 allows for extremely quick reaction time and equally rapid access time to the data storage positions in optical storage medium 22. For example, a typical size for torsion beam 32 would be on the order of approximately 0.55 square mils. The use of such micromechanical structures provides a optical tracking system which does not require the movement of the large masses involved in prior carriage assemblies.

Accordingly, through the use of DMD array 16 containing a predetermined number of individual elements such as DMD 26 described in FIG. 3, an optical tracking system is provided which allows for dramatically improved access times relative to currently available tracking systems. The DMD array can be oriented so that only the selected element deflects the light beam towards the optical storage media such as was described with reference to system 10 in FIG. 1 or the DMD array can be oriented such that all of the elements are illuminated by the impinging beam and only the selected element within the array directs a beam towards the optical storage medium such as described with reference to system 25 in FIG. 2. As discussed previously, the array 16 can be sized such that there is a single element corresponding to each track within the optical storage medium or the array can contain a smaller number of elements than tracks in the storage medium. If there is a smaller number of elements than the number of tracks, the array assembly or the optical storage media may be moved periodically to provide access to every track on the optical storage medium. According to this embodiment, the almost instantaneous access to a plurality of tracks on the optical storage media at any one time allows for a reduced number of mechanical movements necessary and thereby a corresponding decrease in the average access time for the system as a whole.

Although the present invention has been described in detail, it should be understood that various changes, substitutions and alterations can be made hereto without departing from the spirit and scope of the invention as defined by the appended claims.

What is claimed is:

1. A method of accessing data storage positions on an optical storage medium, comprising the steps of:
generating a light beam from a light source;
deflecting a selected mirror element of a mirror array to deflect said light beam toward a selected portion of a reflective optical storage medium, wherein said array is formed on a single substrate;

reflecting said deflected light beam from said reflective optical storage medium according to data stored on said reflective optical storage medium;

detecting said light beam after said light beam is reflected from said reflective optical storage medium; and discerning said data stored in said selected portion of said reflective optical storage medium responsive to said step of detecting.

2. The method of claim 1 and further comprising the step of directing the beam such that the beam impinges on each element within the mirror array.

3. The method of claim 1 wherein said step of deflecting comprises the steps of:

selecting a mirror element within the array dependent on the portion of the optical storage medium to be accessed; and providing a deflection signal to an address electrode of the selected mirror element.

4. The method of claim 1 wherein the optical storage medium comprises a plurality of tracks, each of the tracks comprising a plurality of data storage positions and wherein the mirror array comprises a number of mirror elements less than the number of tracks on the optical storage medium such that not all said tracks are accessible from a single position of said array, the method further comprising the step of:

moving the array relative to the optical storage medium such that the track on the optical storage medium may be accessed by said steps of generating a light beam and deflecting a selected mirror element.

5. A method of accessing data storage positions on an optical storage medium, comprising the steps of:

generating a light beam from a light source;

deflecting a selected mirror element of a mirror array wherein said array is formed on a single substrate to deflect light from the light beam toward a selected portion of a reflective optical storage medium;

reflecting said light from said reflective optical storage medium;

detecting the beam after the beam is reflected from said reflective optical storage medium; and discerning the data stored in the selected portion of the optical storage medium responsive to said step of detecting.

6. The method of claim 5 and further comprising the step of directing the beam such that the beam impinges on each element within the mirror array.

7. The method of claim 5 wherein said step of deflecting comprises the steps of:

selecting a mirror element within the array dependent on the portion of the optical storage medium to be accessed; and providing a deflection signal to an address electrode of the selected mirror element.

8. The method of claim 5 wherein the optical storage medium comprises a plurality of tracks, each of the tracks comprising a plurality of data storage positions and wherein the mirror array comprises a number of mirror elements less than the number of tracks on the optical storage medium such that not all said tracks are accessible from a single position of said array, the method further comprising the step of:

moving the array relative to the optical storage medium such that the track on the optical storage medium may be accessed by said steps of generating a light beam and deflecting a selected mirror element.

9. The method of claim 5 wherein said reflecting step comprises reflecting said light from said reflective optical medium back to said selected mirror element.

10. The method of claim 9 further comprising the step of separating the beam of light reflected from said reflective optical storage medium and the beam of light directed toward said reflective optical storage medium.

* * * * *